Jan. 23, 1968   A. LEYER   3,364,802
ROTARY SAW WITH CUTTING TEETH ON INNER PERIPHERY
Filed March 2, 1965   5 Sheets-Sheet 1

INVENTOR
ALFRED LEYER

BY Owen, Wickersham & Erickson
ATTORNEYS

Jan. 23, 1968  A. LEYER  3,364,802
ROTARY SAW WITH CUTTING TEETH ON INNER PERIPHERY
Filed March 2, 1965  5 Sheets-Sheet 2
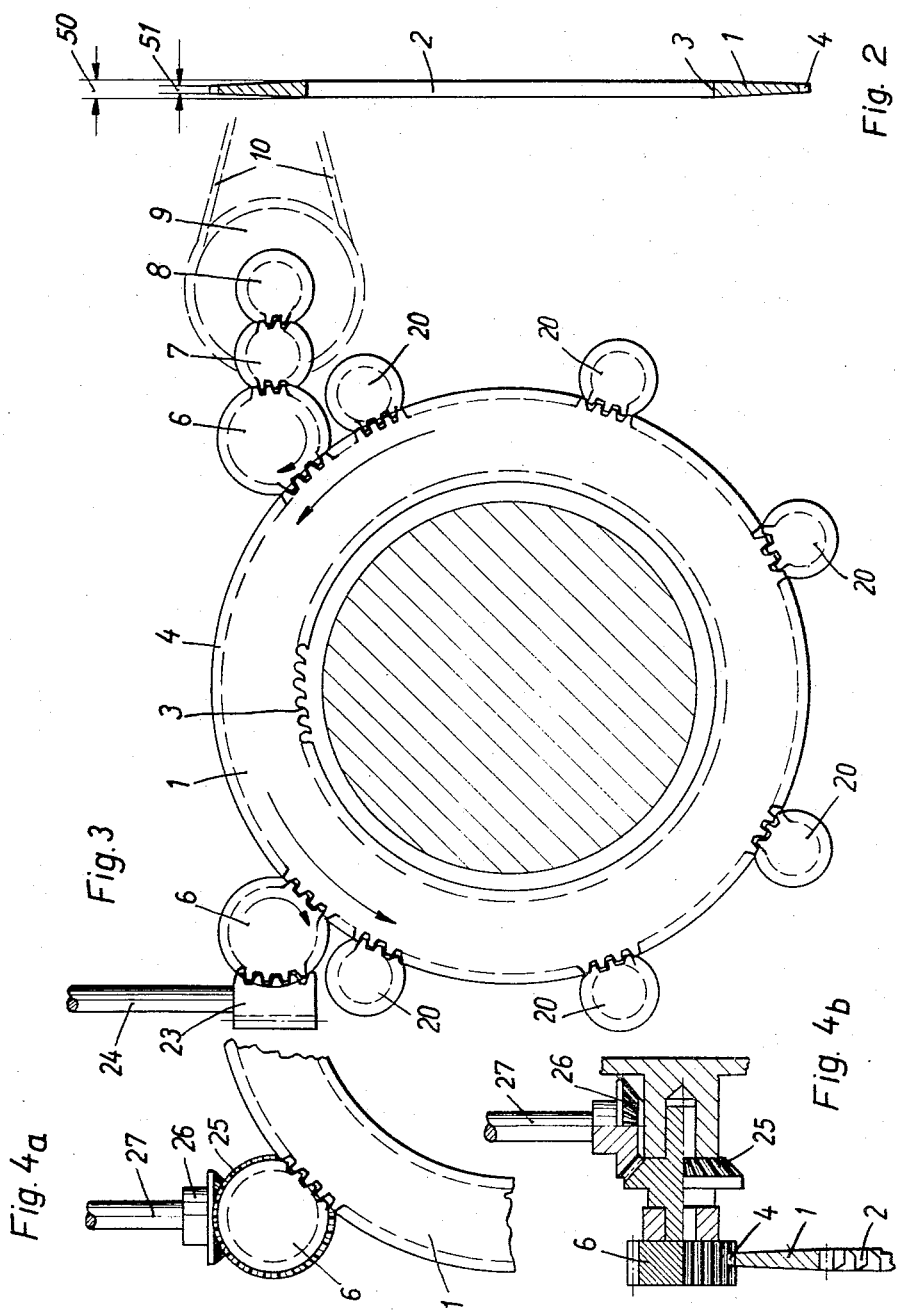
INVENTOR
ALFRED LEYER
BY Owen, Wickersham & Erickson
ATTORNEYS Jan. 23, 1968  A. LEYER  3,364,802
ROTARY SAW WITH CUTTING TEETH ON INNER PERIPHERY
Filed March 2, 1965  5 Sheets-Sheet 3

INVENTOR
ALFRED LEYER

BY Owen, Wickersham & Erickson

ATTORNEYS

Jan. 23, 1968  A. LEYER  3,364,802
ROTARY SAW WITH CUTTING TEETH ON INNER PERIPHERY
Filed March 2, 1965  5 Sheets-Sheet 4

INVENTOR
ALFRED LEYER

BY Owen, Wickersham & Erickson

ATTORNEYS

Jan. 23, 1968  A. LEYER  3,364,802
ROTARY SAW WITH CUTTING TEETH ON INNER PERIPHERY
Filed March 2, 1965  5 Sheets-Sheet 5

INVENTOR
ALFRED LEYER

BY *Owen, Wickersham & Erickson*

ATTORNEYS

United States Patent Office 3,364,802
Patented Jan. 23, 1968

3,364,802
ROTARY SAW WITH CUTTING TEETH
ON INNER PERIPHERY
Alfred Leyer, Dusseldorf, Germany, assignor, by mesne assignments, to W. R. Grace & Co., New York, N.Y., a corporation of Connecticut
Filed Mar. 2, 1965, Ser. No. 436,512
Claims priority, application Germany, Mar. 9, 1964,
B 56,587
2 Claims. (Cl. 83—470)

This invention relates to a cold saw of the type having an annular saw blade with saw teeth on its inner periphery and an outside periphery provided with gear teeth.

When cold saws of this type are arranged relative to a round workpiece, two confronting arcs are obtained, which are concave in the same direction and have different radii of curvature. As a result, the number of saw teeth which act on the workpiece at the same time is larger than in case of saw blades having external teeth, where the two arcs formed by the saw blade and workpiece are convex to each other so that they are substantially only in point contact with virtually only one saw tooth in action at the point of contact.

In prior art cold saws of this type, the saw blade was gripped on both faces in a holder. Such a saw blade could not be used, however, for sawing through a workpiece which is almost as wide as the diameter of the central opening in the saw blade.

The present invention is based on the new recognition that the disadvantages of the prior art can be avoided and a maximum performance of the saw can be obtained in a cold saw having an annular saw blade with saw teeth on the inner periphery and with the outside periphery set with gear teeth, by having the thickness of the saw blade larger at the saw teeth than at the gear teeth and by providing driving or idling members in mesh with the external gear teeth at least at three points of its outside periphery.

In this invention, the support for the saw blade and its driving and idling members preferably comprises a pivoted plate, which may comprise a carriage, i.e., a member which is movable substantially along a straight line.

Further details and advantages of the invention will become apparent from the drawing, which shows embodiments of the invention.

FIG. 2 is an enlarged view in end elevation and in section of the saw blade of FIG. 1.

FIG. 3 is a fragmentary view in said elevation on a larger scale than FIG. 1 of a cold saw showing two different saw blade drive means, one at the right like FIG. 1 and a modified form on the left.

FIG. 4a is a fragmentary view of a portion of the left side of FIG. 3, on a larger scale.

FIG. 4b is a transverse sectional view of the portions shown in FIG. 4a.

Figure 1:
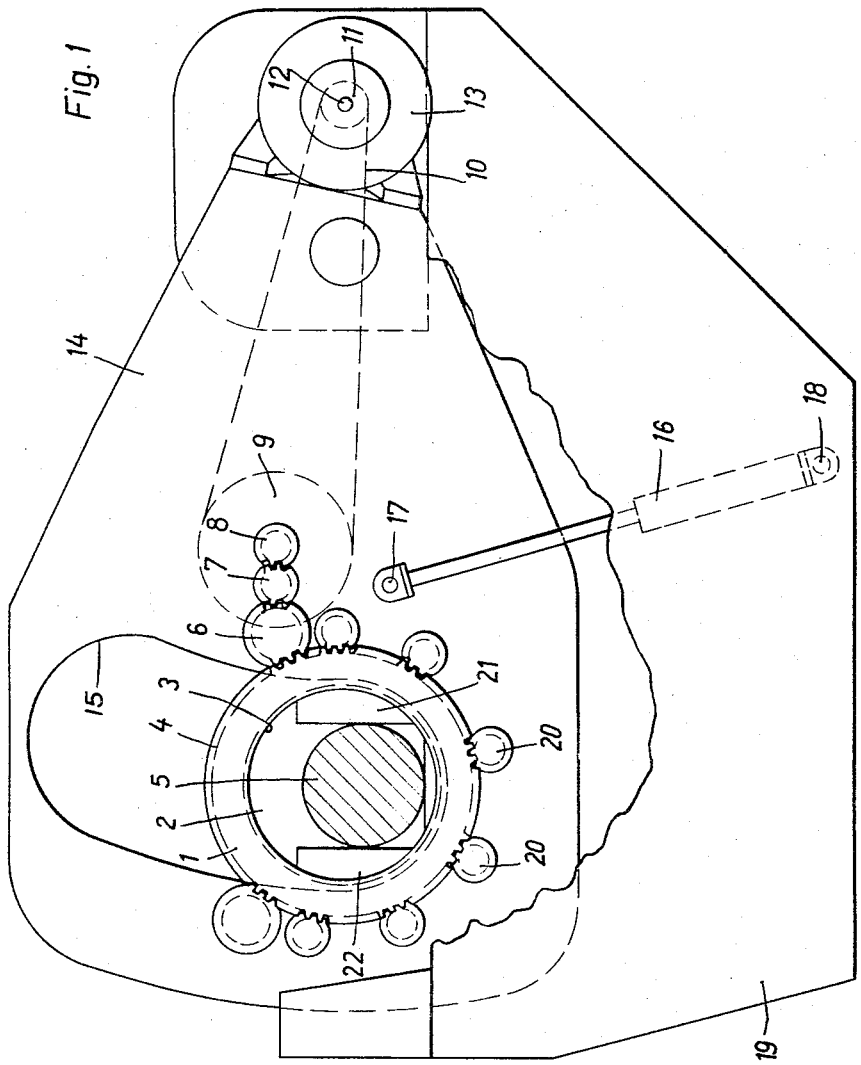
FIG. 1 is a view in side elevation and partly in section of a cold saw with a pivoted plate for supporting the driving and idling gears.

In FIG. 1, an annular saw blade 1 has an opening 2, which is adjoined by saw teeth or cutting teeth 3 on the blade's inner periphery. The outer periphery of the saw blade 1 is set with gear teeth 4. A workpiece 5 is shown lying in the opening 2 of the saw blade 1. While the radial width of the saw blade 1 is much smaller than the diameter of the workpiece 5, it is apparent that the saw blade 1 can saw completely through this workpiece 5.

The drive means for the saw blade 1 comprise a driving gear 6, shown in the right of the blade in FIG. 1 and in mesh with the back gears 7, 8. The drive shaft, not shown, of the gear 8 carries a V-belt pulley 9, indicated in phantom, which is driven by a V-belt 10, also shown in phantom, from a V-belt pulley 11 keyed to a drive shaft 12 of a motor 13.

A plate 14 is pivoted on the shaft 12 and is formed with a segment-shaped opening 15, which enables a pivotal movement of the plate 14 about the workpiece 5. The plate 14 is controlled by a hydraulic or pneumatic actuator 16, which is pivoted at 17 to the plate 14 and at 18 to the machine frame 19. In some cases it may be desirable to arrange the piston-cylinder actuator 16 so that it acts in the same sense as the weight of the saw blade and the parts connected to it. In other cases, the weight of these parts may be too heavy for a good saw cut. In this case the actuator means 16 is controlled to take up a larger or smaller part of the weight of said parts.

Idling gears 20 in mesh with the teeth 4 help to support or back up the saw blade 1 at suitable points. It is suitable to provide at least two idling gears 20 in addition to the driving gear 6. A larger number of idling gears 20 is preferably used (as shown in FIG. 1) with relatively large saw blades. The workpiece 5 itself is gripped between the jaws 21, 22 so that its position is not changed during the saw cut.

As is apparent from FIG. 2, the thickness 50 of the saw blade 1 at the saw teeth or cutting teeth 3 is much larger than the thickness 51 at the gear teeth 4, so that the saw teeth 3 can cut freely. This effect may be improved by imparting a set to the saw teeth in known manner. The transition between the thicker and thinner portions of the saw blades is preferably straight in radial section although this is not essential.

The mode of operation of a cold saw of FIG. 1 is clearly apparent from the foregoing and need not be explained.

FIG. 3 shows an embodiment with two drive gears 6. For illustration, the right-hand portion of the embodiment of FIG. 3 corresponds to the description of FIG. 1, but the drive means shown on the left in FIG. 3 differs from those in FIG. 1 in that the gear 6 is driven by a worm 23, which is mounted on a driving shaft 24.

Another drive means is shown in FIGS. 4a and 4b, where a pair of bevel gears 25, 26 are provided for driving the gear 6. The gear 26 is driven by a shaft 27.

Figure 5:
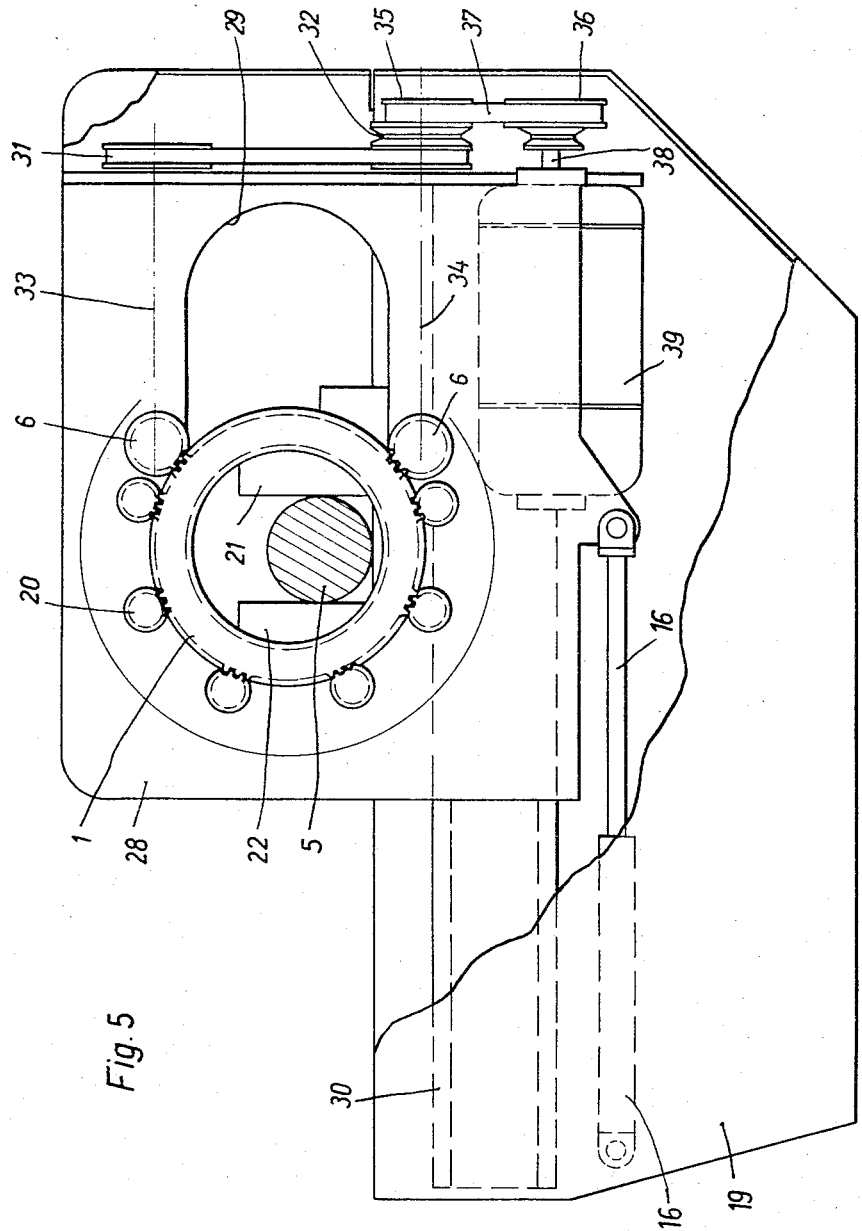
FIG. 5 is a view in side elevation and partly in section of a modified form of cold saw of this invention with a carriage supporting the saw blade.

FIG. 5 shows a modified form of carriage 28 for supporting the saw blade 1. The carriage 28 has an opening 29 for receiving the workpiece 5 and moves on a screw 30 to advance the saw blade 1 across the workpiece 5. There are two driving gears 6, which are connected to V-belt pulleys 31, 32 by suitable transmission means 33, 34, such as a shaft at right angles to the plane of the drawing with the pulley wheels mounted thereon. The transmission shaft 34 carries a further driving wheel 35, which is driven from the pulley 36 by the belt 37. The pulley 36 is carried by a drive shaft 38, driven by a motor 39. The member 30 need not constitute a feed or lead screw. It may consist only of a guide rod. In this case, a piston-cylinder arrangement 16 is provided for moving the carriage.

Figure 6:
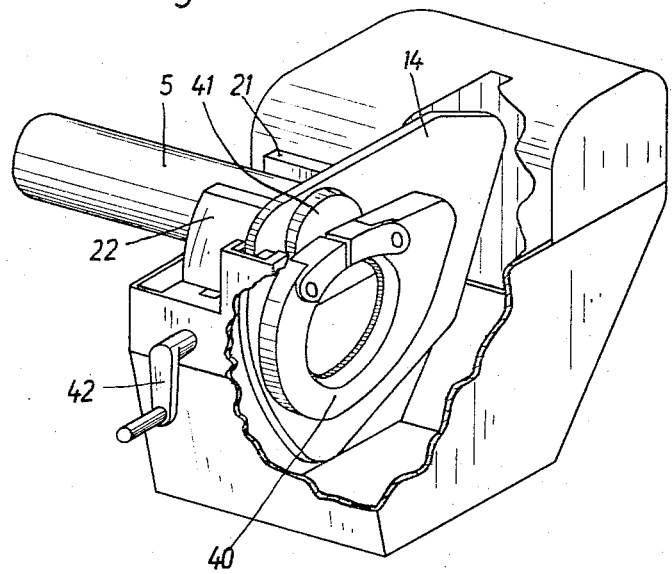
FIG. 6 is a perspective view of a cold saw similar to that of FIG. 1 but with some modifications. Some parts are broken away.

FIG. 6 is a perspective view showing the embodiment of FIG. 1 plus a guard 40 for the saw blade. The view shows a cut surface 41 of the workpiece 5, and an actuator 42 for gripping the workpiece 5 between the members 21 and 22.

Figure 7:
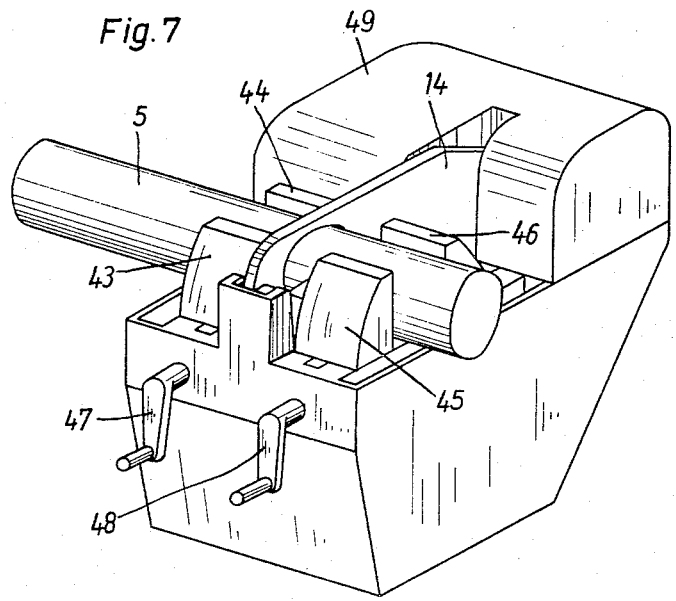
FIG. 7 is a perspective view of another modified form of cold saw of the invention.

FIG. 7 shows dual gripping means for the workpiece 5. These gripping means comprise pairs of clamping jaws 43, 44 and 45, 46, which can be adjusted respectively with the aid of actuating screws with handles 47, 48. A guard 49 is provided for the saw blade drive means.

Figure 8:
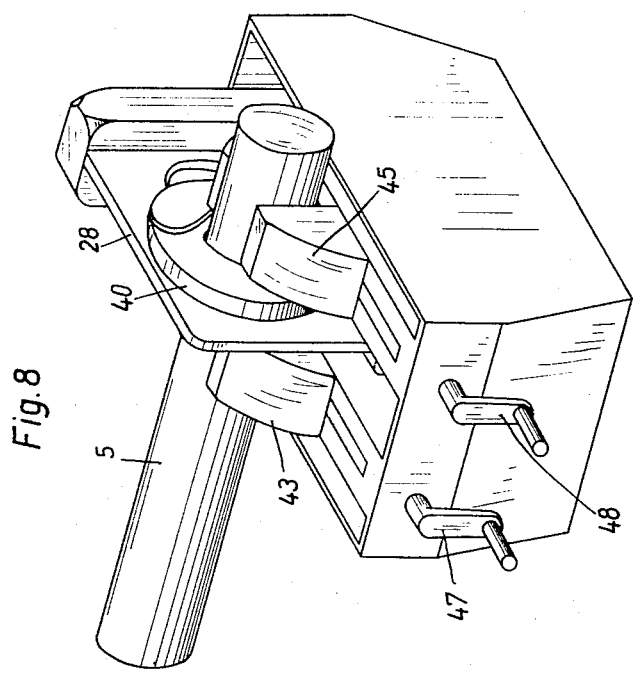
FIG. 8 is a perspective view of a further modification.

The embodiment in accordance with FIG. 8 corresponds to FIG. 5. The horizontally displaceable carriage 28 is movable in relation to the clamping jaws which grip the workpiece 5 (only the jaws 43 and 45 are visible). Opening and closing of the clamping jaws is accomplished by means of pinions driven by crank handles 47 and 48.

The invention is not confined to the embodiment shown and described, but may be modified, supplemented or improved in various ways within the scope of the underlying inventive concept.

What is claimed is:

1. A saw comprising, a frame, an annular saw blade disposed vertically and having a constant diameter inner periphery provided with inwardly projecting uniform cutting teeth and an outer periphery provided with gear teeth, one driving gear and a plurality of idling gears in mesh with said gear teeth at peripherally spaced points, supporting the weight of said saw blade, a carriage pivotally mounted on said frame for carrying said gears and movable relative to said frame, hydraulic means for controlling the movement of said carriage relative to said frame, and means on said frame for holding a workpiece so that it is surrounded by said saw blade, said cutting teeth being in pressure contact with said workpiece under the action of gravity, said hydraulic means being operable to modify the pressure applied by said cutting teeth to said workpiece.

2. A saw comprising an annular saw blade lying in a vertical plane and having a constant diameter inner periphery provided with inwardly projecting uniform cutting teeth and an outer periphery provided with gear teeth, said blade varying in thickness having its greatest thickness at said cuttting teeth and its smallest thickness at said gear teeth, at least one driving gear and a plurality of idling gears in mesh with said gear teeth at peripherally spaced points to drive them and to support the weight of said blade, workpiece holding means for holding a workpiece so that it is surrounded by said saw blade with said cutting teeth in pressure contact with said workpiece under the action of gravity, support means movable relative to said workpiece holding means and carrying said gears, and actuator means acting on said support means for changing the contact pressure between said cutting teeth and said workpiece.

References Cited

UNITED STATES PATENTS

| | | | |
|---|---|---|---|
| 1,205,125 | 11/1916 | Dies | 83—459 |
| 1,063,789 | 6/1913 | Gorton. | |
| 3,086,567 | 4/1963 | Jetten | 143—44 |

FOREIGN PATENTS

| | | |
|---|---|---|
| 54,335 | 4/1923 | Sweden. |

ANDREW R. JUHASZ, *Primary Examiner.*